United States Patent
Oda et al.

[11] Patent Number: 5,875,687
[45] Date of Patent: Mar. 2, 1999

[54] PROTECTIVE CAP SYSTEM FOR BICYCLE CABLE

[75] Inventors: Hiromi Oda, Wakayama; Masanori Sugimoto, Osakasayama, both of Japan

[73] Assignee: Shimano, Inc., Osaka, Japan

[21] Appl. No.: 631,838

[22] Filed: Apr. 10, 1996

[51] Int. Cl.[6] .................................... F16C 1/10
[52] U.S. Cl. ........................ 74/502.4; 74/502.5
[58] Field of Search ............... 74/502.4, 502.5, 74/502.6

[56] References Cited

U.S. PATENT DOCUMENTS

| | | | |
|---|---|---|---|
| 2,845,812 | 8/1958 | Pobar | 74/501 |
| 3,678,964 | 7/1972 | Andrews | 138/103 |
| 4,180,346 | 12/1979 | Blake | 74/502.6 X |
| 4,304,148 | 12/1981 | Hamman | 74/502.4 |
| 4,304,149 | 12/1981 | Heimann | 74/502.4 |
| 4,534,239 | 8/1985 | Heimann | 74/501 |
| 4,621,937 | 11/1986 | Maccuaig | 74/502.4 X |
| 4,887,482 | 12/1989 | Romano | 74/502.6 |
| 4,892,005 | 1/1990 | Nagano | 74/502.4 |
| 4,963,050 | 10/1990 | Wendt et al. | 74/502.4 X |
| 5,582,074 | 12/1996 | Kelley et al. | 74/502.4 |

FOREIGN PATENT DOCUMENTS

| | | | |
|---|---|---|---|
| 595030 | 6/1959 | Italy | 74/502.4 |
| 60-22206 | 5/1985 | Japan . | |
| 63-54576 | 4/1988 | Japan . | |
| 837626 | 6/1960 | United Kingdom . | |

*Primary Examiner*—Charles A. Marmor
*Assistant Examiner*—Mary Ann Battista
*Attorney, Agent, or Firm*—James A. Deland

[57] ABSTRACT

A protective cap for a bicycle control cable of the type having an inner cable which moves within a cable housing includes a first section sized to fit over the cable housing, and a second section sized for sealingly fitting over the inner cable. The second section is formed from a flexible material so that the second section can sealingly follow any bend in the inner cable.

34 Claims, 2 Drawing Sheets

5,875,687

PROTECTIVE CAP SYSTEM FOR BICYCLE CABLE

BACKGROUND OF THE INVENTION

The present invention is directed to an apparatus for preventing contamination of a bicycle control cable and, more specifically, to a protective cap system for preventing deterioration of the cable as a result of the penetration of foreign matter.

Bicycle front and rear brakes and derailleurs are operated by control cables connected to shift lever units or brake levers located on the handle bars. The control cables comprise an inner cable that is slidingly disposed within an outer casing. The inner cable is made by twisting several steel wires together. The outer casing is ordinarily constructed of a synthetic resin cable liner, a band steel strip that is spirally wound around the cable liner, and a synthetic resin jacket that is used to cover the outer circumference of the band steel strip.

The outer casing usually terminates at a position between the shifting lever unit or brake lever and the rear or front derailleur, thus leaving the inner cable exposed.

Unfortunately, foreign objects such as mud, dust, etc., penetrate from the exposed end of the cable, thus increasing the slide resistance between the inner cable and cable liner. As a result, the brakes or shift mechanism, etc., becomes more difficult to operate. Furthermore, foreign objects such as clay and sand in mud act as grinding materials, causing the cable liner and inner cable to wear more quickly. Contamination of the gap between the inner cable and the outer casing thus should be avoided wherever possible.

FIG. 1 shows a known protective cap 10 having a rigid first section 12 which fits over the free end of an outer casing 14 of a control cable 18. Cap 10 also has a rigid second section 22 with an inner diameter slightly larger than an outer diameter of an inner cable 26. Unfortunately, cap 10 still has a gap 30 between the inner surface of second section 22 and the outer surface of inner cable 26, and gap 30 widens when the inner cable 26 flexes in the radial direction shown in the figure. The widened gap increases the chance that contaminants will enter the control cable.

FIG. 2 shows another known protective cap 40 which fits over the free end of outer casing 14 of control cable 18. Protective cap 40 includes a generally toroidally shaped resilient seal 48 extending radially inwardly from a rigid peripheral wall 44. While this structure is ordinarily satisfactory when the inner cable extends straight from outer casing 14, a gap 50 forms when inner cable 26 flexes in the radial direction, since the position of seal 48 is fixed by the rigid wall 44. Gap 50 allows contaminants to enter the control cable.

SUMMARY OF THE INVENTION

The present invention is directed to a protective cap system for a bicycle control cable wherein contaminants do not enter the control cable even when the inner cable flexes in the radial direction. In one embodiment of the present invention, a protective cap for a control cable of the type having an inner cable which moves within a cable housing includes a first section sized to fit over the cable housing, and a second section sized for sealingly fitting over the inner cable. The second section is formed from a flexible material so that the second section can sealingly follow any bend in the inner cable. The cable housing may be the outer casing of the control cable, or else it may be some other structure which fits over the outer casing (such as a nose cap) or cable. In the latter case the first section of the protective cap may have an outer diameter sized to fit within an inner portion of the cable housing.

In another embodiment, the protective cap system comprises an outer cap and an inner cap. The outer cap includes a first outer cap section and a second outer cap section, wherein the first outer cap section is sized to fit over the cable housing. The inner cap includes a first inner cap section sized to fit within the second outer cap section, and a second inner cap section sized for sealingly fitting over the inner cable. As in the first embodiment, the second inner cap section is formed from a flexible material so that the second section can sealingly follow any bend in the inner cable.

DETAILED DESCRIPTION OF THE EMBODIMENTS

Figure 1:
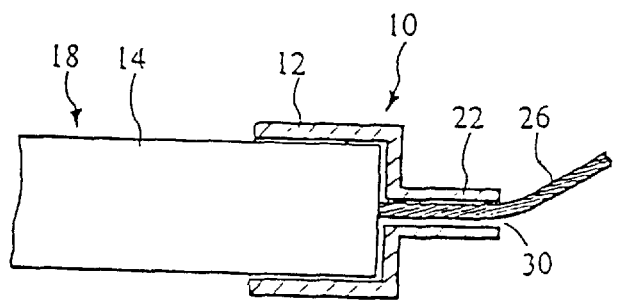
FIG. 1 is a partial cross sectional diagram of a known protective cap for a bicycle control cable.
Figure 2:
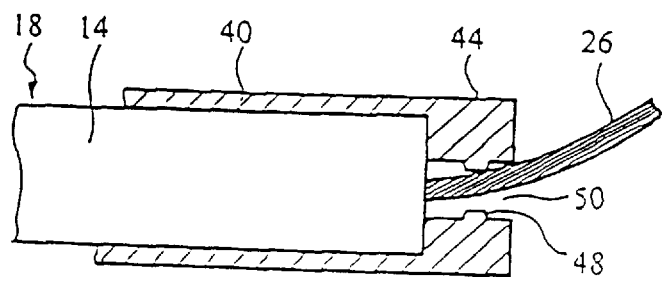
FIG. 2 is a partial cross sectional diagram of another known protective cap for a bicycle control cable.
Figure 3:
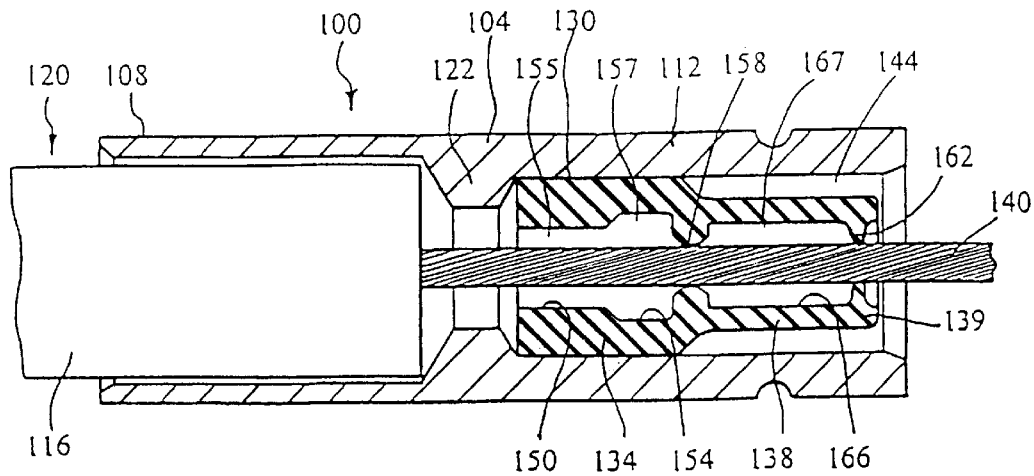
FIG. 3 is a partial cross sectional diagram of a particular embodiment of a protective cap system according to the present invention for a bicycle control cable.

FIG. 3 is a partial cross sectional diagram of a particular embodiment of a protective cap system 100 according to the present invention. Protective cap system 100 comprises an outer cap 104 and an inner cap 130. Outer cap 104 includes an outer cap section 108 and an outer cap section 112. Outer cap section 108 has an inner diameter sized to fit over a cable housing 116 which, in this embodiment, comprises the outer casing of a bicycle control cable 120. In this embodiment, the free end of cable housing 116 abuts against a shoulder 122 which extends along the inner periphery of outer cap 104 at an intermediate location thereof, and the outer peripheral surfaces of outer cap section 108 and outer cap section 112 have approximately the same diameter.

Inner cap 130 includes an inner cap section 134 and an inner cap section 138. Inner cap section 134 has an outer diameter sized to fit within the outer cap section 112, and inner cap section 138 has an inner diameter sized for sealingly fitting over an inner cable 140 of control cable 120. In this embodiment, inner cap section 138 is in the form of a substantially constant-diameter elongated tube or sleeve having a free end 139 through which the inner cable 140 exits. Inner cap section 138 preferably is formed from a flexible material such as rubber. Of course, to facilitate manufacture the entire inner cap 130 may be formed as one piece from a flexible material, and in this embodiment inner cap section 134 is so constructed.

Figure 4:
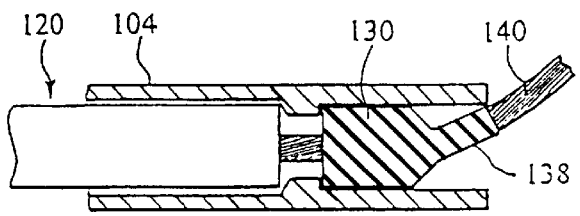
FIG. 4 is a partial cross sectional diagram of the protective cap system shown in FIG. 3 illustrating how the protective cap sealingly follows a bend in the inner cable.

In this embodiment, inner cap section 134 has an outer diameter larger than an outer diameter of inner cap section 138, while the inner surface of outer cap section 112, which fully encloses the inner cap 130, has a substantially constant diameter. As a result, a space 144 is formed between the inner surface of outer cap section 112 and the outer surface of inner cap section 138. This allows inner cap section 138 to flex in the radial direction as shown in FIG. 4 in order to follow any bend in inner cable 140.

Inner cap section 134 has an inner surface 150 and an inner surface 154. In this embodiment, both inner surface 150 and inner surface 154 have a diameter greater than an outer diameter of inner cable 140, but the diameter of inner surface 154 is greater than the diameter of inner surface 150. As a result, a space 155 is formed between inner surface 150 and inner cable 140, and a space 157 is formed between inner surface 154 and inner cable 140.

An inner peripheral projection 158 having an inner diameter slightly less than the outside diameter of inner cable 140 is disposed at the transition between inner cap section 134 and inner cap section 138 for sealingly fitting over the outer surface of inner cable 140. Another inner peripheral projection 162 having an inner diameter slightly less than the outside diameter of inner cable 140 is disposed at the free end 139 of inner cap section 138 for sealingly fitting over the outer surface of inner cable 140. In this embodiment, both inner peripheral projections 158,162 are located so that space 144 is located between the inner surface of outer cap section 112 and the inner peripheral projections 158,162. When inner cap 130 is fitted over inner cable 140, the outer surface of inner cap section 138 bulges into space 144 to relieve excess friction between inner peripheral projections 158,162 and inner cable 140.

An inner surface 166 of inner cap section 138 has a diameter greater than the outer diameter of inner cable 140, thus forming a space 167 therebetween. In the unlikely event that water passes through the barrier formed by inner peripheral projection 162, then space 167 functions as a reservoir to collect the water and prevent the water from contacting inner cable 140 or inner peripheral projection 158. In the even more unlikely event that water passes through the barrier formed by inner peripheral projection 158, then space 157 acts as another reservoir to prevent the water from contacting inner cable 140 or proceeding toward housing 116.

Figure 5:
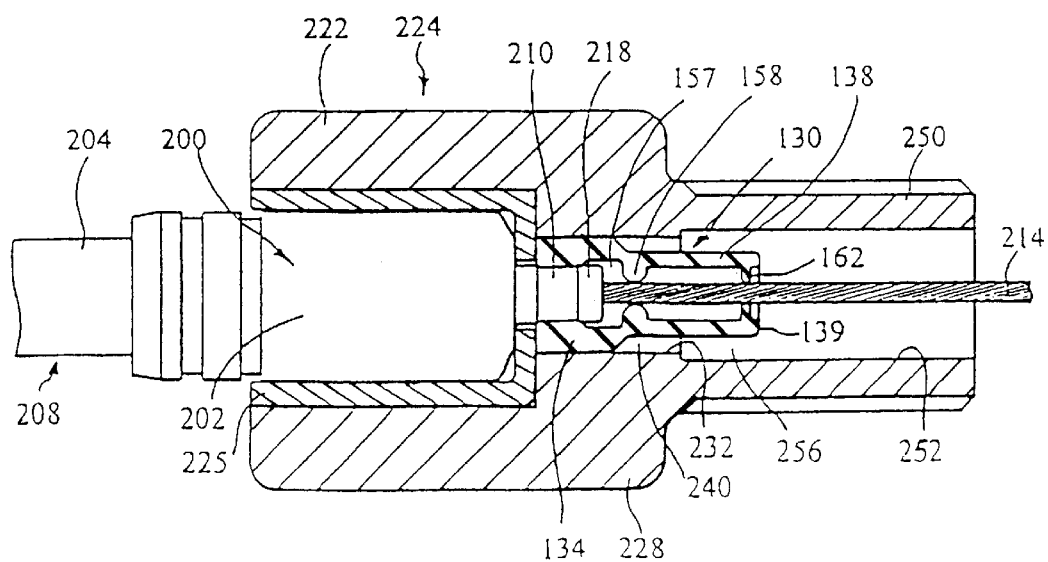
FIG. 5 is a partial cross sectional diagram of an alternative embodiment of a protective cap system according to the present invention.

FIG. 5 is a partial cross sectional diagram of an alternative embodiment of a protective cap system according to the present invention. In this embodiment, the structure of the inner cap 130 is the same as in the first embodiment, so a detailed description of its structure will be omitted.

In this embodiment, a nose cap 200 has a nose cap section 202 and a nose cap section 210. Nose cap section 202 is sized to fit over an outer casing 204 of a control cable 208, and nose cap section 210 has a smaller outer diameter than nose cap section 202. An inner cable 214 exits through a radially expanded free end 218 of nose cap section 210. Nose cap section 202 is fitted within an outer cap section 222 of an outer cap 224 which, in this embodiment, is used for adjusting the position of inner cable 214 relative to outer casing 204 in a well known manner. A spacer cap 225 is fitted between an inner surface of outer cap section 222 and an outer surface of nose cap section 202.

Outer cap 224 further includes an outer cap section 228 having an inner surface 232 in which is fitted inner cap section 134. In this embodiment, a diameter of inner surface 232 is less than a diameter of the inner surface of outer cap section 222. As in the first embodiment, a space 240 is formed between inner surface 232 and the outer surface of inner cap section 138. Furthermore, outer cap 224 includes an outer cap section 250 having an outer diameter less than the outer diameter of outer cap sections 222 and 228. An inner surface 252 of outer cap section 250 has an inner diameter slightly greater than the inner diameter of outer cap section 228, and a space 256 is formed between inner surface 252 and inner cap section 138. As in the first embodiment, spaces 240 and 256 allow inner cap section 138 to follow any bend in cable 214, and they accommodate bulging of cap section 138 resulting from inner peripheral projections 158,162. Furthermore, since outer cap section 250 extends beyond free end 139 of inner cap section 138, outer cap section 250 helps shield inner cable 214 and inner cap 130 from contaminants, thus increasing the protective ability of the system.

In this embodiment, nose cap section 210 is fitted within inner cap section 134 such that expanded end 218 fits within space 157. This helps lock inner cap 130 to nose cap 200. Additionally, end 218 projects into space 157 so that space 157 completely surrounds at least part of the side surface of end 218. This structure further ensures that any water entering space 157 will be prevented from entering nose cap 200.

While the above is a description of various embodiments of the present invention, further modifications may be employed without departing from the spirit and scope of the present invention. For example, as used herein the term "cable housing" may comprise the outer casing of the control cable, a nose cap such as nose cap 200 shown in FIG. 5, or even cap 104 shown in FIG. 3. In other words, the term properly describes any structure in which the inner cable moves. If desired, the outer caps shown may be omitted, and the inner cap may be directly fitted on the end of the outer casing of the control cable. Outer cap section 112 in the first embodiment may extend beyond the free end 139 of inner cap section 138 in a manner similar to that shown in FIG. 5.

Clearly, many other variations are possible. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A protective cap system for a control cable comprising:
   a rigid one-piece cable housing (104,224) for receiving an inner cable (140,214) therethrough:
   a cap (130) including;
      a first section (134) sized to fit within an inner portion of the cable housing (104,224); and
      a second section (138) sized for sealingly fitting over the inner cable (140,214);
      wherein the second section (138) is formed from a flexible material and terminates at a free end (139);
   wherein the entire cap (130) is disposed within the cable housing (104,224);
   wherein an outer peripheral surface of the first section (134) of the cap (130) is sealingly fitted to an inner peripheral surface of the cable housing (104,224);
   wherein an outer surface of the second section (138) and an inner surface of the cable housing (104,224) define a space (144,256) therebetween; and
   wherein the space (144,256) extends continuously from an intermediate portion of the cap (130) past the free end (139) of the second section (138) of the cap (130).

2. A protective cap system according to claim 1 further comprising a first inner peripheral projection (158,162) extending radially inwardly from an inner surface of the cap.

3. A protective cap system according to claim 2 wherein the first inner peripheral projection (158,162) is disposed on an inner surface of the second section (138).

4. A protective cap system according to claim 3 wherein the first inner peripheral projection (162) is disposed in close proximity to the free end (139) of the second section (138).

5. A protective cap system according to claim 2 wherein the first inner peripheral projection (158) is disposed in close proximity to a transition between the first section (134) and the second section (138).

6. A protective cap system according to claim 2 further comprising a second inner peripheral projection (162) extending radially inwardly from the inner surface of the cap, wherein the first inner peripheral projection (158) is disposed in close proximity to an intermediate portion of the cap, and wherein the second inner peripheral projection (162) is disposed in close proximity to the free end (139) of the second section (138).

7. A protective cap system according to claim 1 wherein the first section (134) has an outer diameter greater than an outer diameter of the second section (138).

8. A protective cap system according to claim 7 further comprising a first inner peripheral projection (158,162) extending radially inwardly from an inner surface of the cap.

9. A protective cap system according to claim 8 wherein the first inner peripheral projection (158,162) is disposed on an inner surface of the second section (138).

10. A protective cap system according to claim 9 wherein the first inner peripheral projection(162) is disposed in close proximity to the free end (139) of the second section (138).

11. A protective cap system according to claim 8 wherein the first inner peripheral projection (158) is disposed on an inner surface of the second section (138) in close proximity to a transition between the first section (134) and the second section (138).

12. A protective cap system according to claim 8 further comprising a second inner peripheral projection (162) extending radially inwardly from the inner surface of the cap, wherein the first inner peripheral projection (158) is disposed on an inner surface of the second section (138) in close proximity to a transition between the first section (134) and the second section (138), and wherein the second inner peripheral projection (162) is disposed at the free end (139) of the second section (138).

13. A protective cap system according to claim 12 wherein the second inner peripheral projection (162) is located in the second. section (138) so that the space (144,256) is disposed between the second inner peripheral projection and the inner surface of the cable housing.

14. The protective cap system according to claim 1 wherein the first section (134) of the cap (130) has a straight outer peripheral first surface, and wherein the second section (138) of the cap (130) has a straight outer peripheral second surface.

15. The protective cap system according to claim 1 wherein the outer peripheral surface of the first section (134) of the cap (130) contacts the inner peripheral surface of the cable housing (104,224).

16. A protective cap system for a control cable comprising:
   a cable housing (116,200,204) for receiving an inner cable (140,214) therethrough;
   an outer cap (104,224) including a rigid first outer cap section (108,222) and a rigid second outer cap section (112,228), the first outer cap section (108,222) being sized to fit over the cable housing (116,200,204); and
   an inner cap (130) including:
      a first inner cap section (134) sized to fit within the second outer cap section (112,228);
      a second inner cap section (138) sized for sealingly fitting over the inner cable (140,214); and
      wherein the second inner cap section (138) is formed from a flexible material and terminates at a free end (139);
   wherein the entire inner cap (130) is disposed within the second outer cap section (112,228);
   wherein an outer peripheral surface of the first inner cap section (134) is sealingly fitted to an inner peripheral surface of the second outer cap section (112,228);
   wherein an outer surface of the second inner cap section (138) and an inner surface of the second outer cap section (112,228) define a space (144,256) therebetween; and
   wherein the space (144,256) extends continuously from an intermediate portion of the inner cap (130) past the free end (139) of the second section (138) of the inner cap (130).

17. A protective cap system according to claim 16 wherein an outer diameter of the first outer cap section (108,222) is approximately equal to an outer diameter of the second outer cap section (112,228).

18. A protective cap system according to claim 16 wherein the first inner cap section (134) has an outer diameter greater than an outer diameter of the second inner cap section (138).

19. The protective cap system according to claim 16 wherein the first inner cap section (134) has a straight outer peripheral first surface, and wherein the second inner cap section (138) has a straight outer peripheral second surface.

20. The protective cap system according to claim 16 wherein the outer peripheral surface of the first inner cap section (134) contacts the inner peripheral surface of the second outer cap section (112,228).

21. A protective cap system for a control cable comprising:
   a cable housing (116,200,204) for receiving an inner cable (140,214) therethrough;
   an outer cap (104,224) including a first outer cap section (108,222) and a second outer cap section (112,228), the first outer cap section ( 108,222) being sized to fit over the cable housing (116,200,204);
   an inner cap (130) including:
      a first inner cap section (134) sized to fit within the second outer cap section (112,228);
      a second inner cap section (138) sized for sealingly fitting over the inner cable (140,214): and
      wherein the second inner cap section (138) is formed from a flexible material and terminates at a free end (139);
   wherein the entire inner cap (130) is disposed within the second outer cap section (112,228);
   wherein an outer surface of the second inner cap section (138) and an inner surface of the second outer cap section (112.228) define a space (144,256) therebetween;
   wherein the space (144,256) extends continuously from an intermediate portion of the inner cap (130) past the free end (139) of the second section (138) of the inner cap (130); and
   a nose cap (200) having a first nose cap section (202) sized to fit between the cable housing (204) and the first section (222) of the outer cap (224), and a second nose cap section (210) which extends into the first inner cap section (134).

22. A protective cap system according to claim 21 wherein the first nose cap section (202) has an outer diameter greater than an outer diameter of the second nose cap section (210).

23. A protective cap system according to claim 22 wherein the second nose cap section (210) includes a radially expanded portion (218) disposed on a free end thereof.

24. A protective cap system for a control cable (120,208) having an inner cable (140,214) that slides within an outer cable housing (116,204), the protective cap system comprising:
    an outer cap (104,224) including:
        a first outer cap section (108,222), wherein the first outer cap section (108,222) is sized to fit over the outer cable housing (116,204);
        a second outer cap section (112,228); and
        a radially inwardly extending shoulder (122,225) having a first side for facing the cable housing (116,204) and an opposite second side facing in an opposite direction from the first side;
    an inner cap (130) disposed on the opposite second side of the shoulder (122,225) including:
        a first inner cap section (134) sized to fit within the second outer cap section (112,228);
        a second inner cap section (138) sized for sealingly fitting over the inner cable (140,214); and
        wherein the second inner cap section (138) is formed from a flexible material and terminates at a free end (139);
    wherein an outer surface of the second inner cap section (138) and an inner surface of the second outer cap section (112,228) define a space (144,256) therebetween; and
    wherein the space (144,256) extends continuously from an intermediate portion of the inner cap (130) past the free end (139) of the second section (138) of the inner cap (130).

25. A protective cap system according to claim 24 wherein the first inner cap section (134) abuts against the second side of the shoulder (122,225).

26. A protective cap system according to claim 25 wherein the first side of the shoulder (122) is sized, for abutting against the outer cable housing (116).

27. A protective cap system according to claim 24 wherein the first outer cap section (108), the second outer cap section (112) and the shoulder (122) are formed as one piece.

28. A protective cap system according to claim 24 wherein the entire inner cap (130) is disposed within the second outer cap section (112,228).

29. A protective cap system for a control cable comprising:
    a rigid one-piece cable housing (104,224) for receiving an inner cable (140,214) therethrough;
    a cap (130) immovably fixed relative to the cable housing (104,224) including:
        a first section (134) sized to fit within an inner portion of the cable housing (104,224);
        a second section (138) sized for sealingly fitting over the inner cable (140,214);
        wherein the second section (138) is formed from a flexible material and terminates at a free end (139);
    wherein the entire cap (130) is disposed within the cable housing (104,224);
    wherein an outer surface of the second section (138) and an inner surface of the cable housing (104,224) define a space (144,256) therebetween; and
    wherein the space (144,256) extends continuously from an intermediate portion of the cap (130) past the free end (139) of the second section (138) of the cap (130).

30. A protective cap system for a control cable comprising:
    a rigid one-piece cable housing (104,224) for receiving an inner cable (140,214) therethrough;
    a cap (130) including:
        a first section (134) sized to fit within an inner portion of the cable housing (104,224);
        a second section (138) sized for sealingly fitting over the inner cable (140,214);
        wherein the first section (134) has an outer diameter greater than the second section (138);
        wherein the first section (134) is mounted to an inner peripheral surface of the cable housing (104,224);
        wherein the second section (138) is formed from a flexible material and terminates at a free end (139);
    wherein the entire cap (130) is disposed within the cable housing (104,224);
    wherein an outer surface of the second section (138) and an inner surface of the cable housing (104,224) define a space (144,256) therebetween; and
    wherein the space (144,256) extends continuously from an intermediate portion of the cap (130) past the free end (139) of the second section (138) of the cap (130).

31. A protective cap system for a control cable comprising:
    a rigid one-piece cable housing (104,224) for receiving an inner cable (140,214) therethrough;
    a cap (130) immovably fixed relative to the cable housing (104,224) including:
        a first section (134) sized to fit within an inner portion of the cable housing (104,224);
        a second section (138) sized for sealingly fitting over the inner cable (140,214);
        wherein the first section (134) has an outer diameter greater than the second section (138);
        wherein the first section (134) is mounted to an inner peripheral surface of the cable housing (104,224);
        wherein the second section (138) is formed from a flexible material and terminates at a free end (139);
    wherein the entire cap (130) is disposed within the cable housing (104,224);
    wherein an outer surface of the second section (138) and an inner surface of the cable housing (104,224) define a space (144,256) therebetween; and
    wherein the space (144,256) extends continuously from an intermediate portion of the cap (130) past the free end (139) of the second section (138) of the cap (130).

32. A protective cap system for a control cable comprising:
    a cable housing (116,200,204) for receiving an inner cable (140,214) therethrough;
    an outer cap (104,224) including a rigid first outer cap section (108,222) and a rigid second outer cap section (112,228), the first outer cap section (108,222) being sized to fit over the cable housing (116,200,204); and
    an inner cap (130) immovably fixed relative to the outer cap (104,224) including:
        a first inner cap section (134) sized to fit within the second outer cap section (112,228);
        a second inner cap section (138) sized for sealingly fitting over the inner cable (140,214); and
        wherein the second inner cap section (138) is formed from a flexible material and terminates at a free end (139);
    wherein the entire inner cap (130) is disposed within the second outer cap section (112,228);
    wherein an outer surface of the second inner cap section (138) and an inner surface of the second outer cap section (112,228) define a space (144,256) therebetween; and wherein the space (144,256) extends continuously from an intermediate portion of the inner cap (130) past the free end (139) of the second section (138) of the inner cap (130).

33. A protective cap system for a control cable comprising:

a cable housing (116,200,204) for receiving an inner cable (140,214) therethrough;

an outer cap (104,224) including a rigid first outer cap section (108,222) and a rigid second outer cap section (112,228), the first outer cap section (108,222) being sized to fit over the cable housing (116,200,204); and an inner cap (130) including:
   a first inner cap section (134) sized to fit within the second outer cap section (112,228);
   a second inner cap section (138) sized for sealingly fitting over the inner cable (140,214);
   wherein the first inner cap section (134) has an outer diameter greater than an outer diameter of the second inner cap section (138);
   wherein the first inner cap section (134) is mounted to an inner peripheral surface of the outer cap (104, 224);
   wherein the second inner cap section (138) is formed from a flexible material and terminates at a free end (139);

wherein the entire inner cap (130) is disposed within the second outer cap section (112,228);

wherein an outer surface of the second inner cap section (138) and an inner surface of the second outer cap section (112,228) define a space (144,256) therebetween; and wherein the space (144,256) extends continuously from an intermediate portion of the inner cap (130) past the free end (139) of the second section (138) of the inner cap (130).

34. A protective cap system for a control cable comprising:

a cable housing (116,200,204) for receiving an inner cable (140,214) therethrough;

an outer cap (104,224) including a rigid first outer cap section (108,222) and a rigid second outer cap section (112,228), the first outer cap section (108,222) being sized to fit over the cable housing (116,200,204); and an inner cap (130) immovably fixed relative to the outer cap (104,224) including:
   a first inner cap section (134) sized to fit within the second outer cap section (112,228);
   a second inner cap section (138) sized for sealingly fitting over the inner cable (140,214);
   wherein the first inner cap section (134) has an outer diameter greater than an outer diameter of the second inner cap section (138);
   wherein the first inner cap section (134) is mounted to an inner peripheral surface of the outer cap (104, 224);
   wherein the second inner cap section (138) is formed from a flexible material and terminates at a free end (139);

wherein the entire inner cap (130) is disposed within the second outer cap section (112,228);

wherein an outer surface of the second inner cap section (138) and an inner surface of the second outer cap section (112,228) define a space (144,256) therebetween; and wherein the space (144,256) extends continuously from an intermediate portion of the inner cap (130) past the free end (139) of the second section (138) of the inner cap (130).

* * * * *